United States Patent Office 3,833,535
Patented Sept. 3, 1974

3,833,535
NON-DRIPPING FLAME RETARDANT GLASS REINFORCED POLYESTER RESINS
Allen D. Wambach, Pittsfield, Mass., assignor to General Electric Company
No Drawing. Filed Aug. 30, 1971, Ser. No. 176,316
Int. Cl. C08g 51/04
U.S. Cl. 260—40 R    18 Claims

ABSTRACT OF THE DISCLOSURE

Non-dripping flame retardant thermoplastic molding compositions are provided comprising a normally flammable linear polyester, filamentous glass, a flame retardant agent and fumed colloidal silica. The use of the fumed colloidal silica controls dripping and permits the flame retardant agent to be used in amounts sufficient to render the compositions non-burning or self-extinguishing without detracting from their physical properties.

---

This invention relates to flame retardant glass reinforced thermoplastic polyester compositions. More particularly, it pertains to self-extinguishing and non-burning compositions comprising a normally flammable linear high molecular weight polyester, filamentous glass reinforcement, a flame retardant additive and an amount of fumed colloidal silica sufficient to retard dripping.

BACKGROUND OF THE INVENTION

High molecular weight linear polyesters and copolyesters of glycols and terephthalic or isophthalic acid have been available for a number of years. These are described inter alia in Whinfield et al., U.S. 2,465,319 and in Pengilly, U.S. 3,047,539. These patents disclose that the polyesters are particularly advantageous as film and fiber-formers.

Such polyesters have not been widely accepted for use as molding resins, however, until only fairly recently, because of their relative brittleness in thick sections when crystallized from the melt. This problem was overcome by varying the crystal texture, e.g., by using two-step molding cycles or including nucleating agents, and by molecular weight control. This permitted the marketing of injection moldable poly(ethylene terephthalate) which typically, in comparison with other thermoplastics, offer a high degree of surface hardness and abrasion resistance, and lower surface friction.

Simultaneously with the development of injection molding grades of polyester resins, fiber glass reinforced compositions were also provided. See Furukawa et al., U.S. 3,368,995. These injection moldable compositions provided all of the advantages of unfilled polyesters and, also because of the glass reinforcement, the molded articles had higher rigidity, yield strength, modulus and impact strength.

However, although the thermoplastic polyesters, particularly when reinforced with glass fibers are very useful materials, their application has been severely hindered by the fact that they burn readily and are extremely difficult to render fire retardant.

It has been proposed to incorporate non-conventional compounds, such as tetrabromophthalic anhydride, to render glass filled polyester compositions flame retardant but this is not satisfactory to meet Underwriters' Laboratories specifications. Moreover, some degradation is seen; the burning material drips and can ignite combustible materials beneath it, and afterglow remains as a substantial problem.

Three main factors apparently are responsible for the unusual difficulty in rendering the new injection moldable polyester compositions fire retardant—in comparison with other thermoplastics, for example. These factors are:

(a) common flame retardant additives, e.g., phosphorus compounds and antimony compounds do not appear to be very effective when used with polyesters;
(b) polyesters have a tendency to drip while burning and it is difficult to prevent the dripping even with fibrous glass reinforcement; and
(c) polyesters are subject to serious degradation in the presence of a number of conventionally used flame retardants with a loss in physical properties.

It has now been found that if flame retardant agents are used in thermoplastic polyesters in combination with fumed colloidal silica, the dripping of the composite during burning is controlled. Furthermore, the amount of flame retardant agent appears to be easier to optimize, i.e., less is required when the fumed colloidal silica is present. Moreover, there appears to be a beneficial cooperative effect if both the flame retardant and fumed colloidal silica dripping retarding agents are present.

DESCRIPTION OF THE INVENTION

According to this invention there are provided (a) a normally flammable high molecular weight linear polyester resin,
(b) a flame retardant additive in a minor proportion based on said composition but in an amount at least sufficient to render said polyester resin flame retardant and,
(c) fumed colloidal silica in a minor proportion based on said composition in an amount at least sufficient to render said polyester non-dripping and flame retardant, glass reinforced thermoplastic compositions for molding e.g., injection molding, compression molding, transfer molding, and the like comprising:

(a) a normally flammable high molecular weight linear polyester resin;
(b) filamentous glass in an amount of from about 5 to about 90% by weight based on the combined weight of the glass and the resin;
(c) a flame-retardant additive in a minor proportion based on the composition but in an amount at least sufficient to render the polyester resin non-burning or self-extinguishing; and
(d) a fumed colloidal silica in a minor proportion based on the composition but in an amount at least sufficient to render the polyester resin non-dripping (if burning).

When used herein the terms "non-burning," "self-extinguishing," and "non-dripping" are used to describe composites which meet the standards of ASTM test method D–635 and the Underwriters' Laboratories, Bulletin No. 94. In a modification of this latter test, a molded piece of about 2½" x ½" x ⅛" is formed from the composition. When this sample is supported vertically and ignited, if it does not form flaming droplets sufficient to ignite a piece of cotton held 12 inches beneath and extinguishes itself within an average of 5 seconds after each of two 10-second ignitions, the composition is deemed to be non-dripping and flame-retardant to the point where it satisfies the SE–0 requirements set forth by the Underwriters' Laboratories. If the flame is extinguished within an average of 25 seconds but no greater than 30 seconds and no flaming droplets are formed, the material is classifid SE–1. If the flame is extinguished within an average of 25 seconds and flaming droplets are formed, the material is classified SE–II. ASTM test D–635 for flammability comprises contacting the end of a horizontal specimen ½" by 5" and "thickness normally supplied" with a Bunsen burner flame for 25 seconds, and repeating if there is no ignition. If the specimen does ignite but does not continue burning to the 4″ mark after the flame is removed, it is classified as "self-extinguishing by this test."

The higher molecular weight normally fammable linear polyesters used in the present compositions are polymeric glycol esters of terephthalic acid and isophthalic acids. They are available commercially or can be prepared by known techniques such as by the alcoholysis of esters of the phthalic acid with a glycol and subsequent polymerization, by heating glycols with the free acids or with halide derivatives thereof, and the similar processes. These are described in U.S. 2,465,319 and U.S. 3,047,539 and elsewhere.

Although the glycol portion of the polyester can contain from 2 to 10 carbon atoms, it is preferred that it contain from 2 to 4 carbon atoms in the form of linear methylene chains.

Preferred polyesters will be of the family consisting of high molecular weight, polymeric glycol terephthalates or isophthalates having repeating units of the general formula:

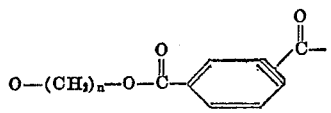

wherein $n$ is a whole number of from 2 to 4 and mixtures of such esters, including copolyesters of terephthalic and isophthalic acids over the entire composition range.

Especially preferred polyesters and poly(ethylene terephthalate) and poly(1,4-butylene terephthalate). Special mention is made of the latter because it crystallizes at such a good rate that it may be used for injection molding without the need for nucleating agents or long cycles, as is sometimes necessary with poly(ethylene terephthalate).

Illustratively, high molecular weight polyesters will have an intrinsic viscosity of at least about 0.4 deciliters/gram as measured in $o$-chlorophenol, a 60/40 phenol-tetrachloroethane mixture or a similar solvent at 25–30° C.

The filamentous glass to be employed as reinforcement in the present compositions is well known to those skilled in the art and is widey available from a number of manufacturers. For compositions ultimately to be employed for electrical uses, it is preferred to use fibrous glass filaments comprised of lime-aluminum borosilicate glass that is relatively soda-free. This is known as "E" glass. However, other glasses are useful where electrical properties are not so important, e.g., the low soda glass known as "C" glass. The filaments are made by standard processes, e.g., by steam or air blowing, flame blowing and mechanical pulling. The preferred filaments for plastic reinforcement are made by mechanical pulling. The filament diameters range from about 0.00012 to 0.00075 inch but this is not critical to the present invention.

The length of the glass filaments and whether or not they are bundled into fibers and the fibers bundled in turn to yarns, ropes or rovings, or woven into mats and the like are also not critical to the invention. However, in preparing the molding compositions it is convenient to use the filamentous glass in the form of chopped strands of from about ⅛″ to about 2″ long. In articles molded from the compositions on the other hand, even shorter lengths will be encountered because, during compounding considerable fragmentation will occur. This is desirable, however, because the best properties are exhibited by thermoplastic injection molded articles in which the filament lengths lie between about 0.000005″ and 0.125 (⅛″).

In general, best properties will be obtained if the sized filamentous glass reinforcement comprises from about 5 to about 90% by weight based on the combined weight of glass and resin, and preferably from about 5 to about 60% by weight. Especially preferably the glass will comprise from about 20 to about 40% by weight based on the combined weight of glass resin. Generally, for direct molding use, up to about 60% of glass can be present without causing flow problems. However, it is useful also to prepare the compositions containing substantially greater quantities, e.g., up to 80–90% by weight of glass. These concentrates can then be custom blended with resins that are not glass reinforced to provide any desired glass content of a lower value.

Because it has been found that certain commonly used flammable sizings on the glass, e.g., dextrinized starch or synthetic polymers, contribute flammability often in greater proportion than expected from the amount present, it is preferred to use lightly sized or unsized glass reinforcements in the present compositions. Sizings if present can readily be removed by heat cleaning or other techniques well known to those skilled in the art.

The flame-retartdant additives useful in this invention comprise a family of chemical compounds well known to those skilled in the art. Generally speaking, the more important of these compounds contain chemical elements employed for their ability to impart flame resistance, e.g., bromine, chlorine, antimony, phosphorus and nitrogen. It is preferred that the flame-retardant additive comprise a halogenated organic compound (brominated or chlorinated), a halogen-containing organic compound in admixture with antimony trioxide, elemental phosphorus or a phosphorus compound, a halogen-containing compound in admixture with a phosphorus compound or compounds containing phosphorus-nitrogen bonds or a mixture of two or more of the foregoing.

The amount of flame-retardant additive used is not critical to the invention, so long as it is present in a minor proportion based on said composition—major proportions will detract from physical properties—but at least sufficient to render the polyester resin non-burning or self-extinguishing. Those skilled in the art are well aware that the amount will vary with the nature of the resin and with the efficiency of the additive. In general, however, the amount of additive will be from 0.5 to 50 parts by weight per hundred parts of resin. A preferred range will be from about 3 to 25 parts and an especially preferred range will be from about 5 to 12 parts of additive per 100 parts of resin. Smaller amounts of compounds highly concentrated in the elements responsible for flame-retardance will be sufficient. Halogenated aromatics may be used at 5 to 12 parts and synergists, e.g., antimony trioxide may be used at about 2 to 5 parts by weight per 100 parts of resin.

Among the useful halogen-containing compounds are those of the formula:

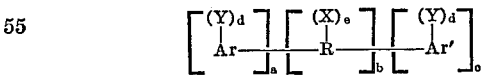

wherein R is an alkylene, alkylidene or cycloaliphatic linkage, e.g., methylene, ethylene, propylene, isopropylene, isopropylidene, butylene, isobutylene, amylene, cyclohexylene, cyclopentylidene, and the like; a linkage selected from the group consisting of: ether; carbonyl; amine; a sulfur containing linkage, e.g., sulfide, sulfoxide, sulfone; a phosphorus-containing linkage; and the like. R can also consist of two or more alkylene or alkylidene linkages connected by such groups as aromatic, amino, ether, carbonyl, sulfide, sulfoxide, sulfone, a phosphorus-containing linkage and the like. Other groups which are represented by R will occur to those skilled in the art.

Ar and Ar′ are mono- or polycarbocyclic aromatic groups such as phenylene, biphenylene, terphenylene, naphthylene, and the like. Ar and Ar′ may be the same or different.

Y is a substituent selected from the group consisting of organic, inorganic or organometallic radicals. The substituents represented by Y include (1) halogen, e.g., chlorine, bromine, iodine or fluorine or (ether groups of the general formula OE, wherein E is a monovalent hydrocarbon radical similar to X or (3) monovalent hydrocarbon groups of the type represented by R or (4) other substituents, e.g., nitro, cyano, etc., said substituents being essentially inert provided there be at least one and preferably two halogen atoms per aryl, e.g., phenyl, nucleus.

X is a monovalent hydrocarbon group exemplified by the following: alkyl, such as methyl, ethyl, propyl, isopropyl, butyl, decyl, and the like; aryl groups, such as phenyl naphthyl, xylyl, tolyl and the like; aralkyl groups, such as benzyl, ethylphenyl and the like; cycloaliphatic groups, such as cyclopentyl, cyclohexyl and the like; as well as monovalent hydrocarbon groups containing inert substituents thereon. It will be understood that where more than one X is used they may be alike or different.

The letter $d$ represents a whole number ranging from 1 to a maximum equivalent to the number of replaceable hydrogens substituted on the aromatic rings comprising Ar or Ar'. The letter $e$ represents a whole number ranging from 0 to a maximum controlled by the number of replaceable hydrogens on R. The letters, $a$, $b$, and $c$ represent whole numbers including 0. When $b$ is not 0, neither $a$ nor $c$ may be 0. Otherwise either $a$ or $c$ but not both may be 0. Where $b$ is 0, the aromatic groups are joined by a direct carbon-carbon bond.

The hydroxyl and Y substituents on the aromatic groups Ar and Ar' can be varied in the ortho, meta or para positions on the aromatic rings and the groups can be in any possible geometric relationship with respect to one another.

Included within the scope of the above formula are biphenyls of which the following are representative:

2,2-bis-(3,5-dichlorophenyl)propane
bis-(2-chlorophenyl)methane
bis-(2,6-dibromophenyl)methane
1,1-bis-(4-iodophenyl)ethane
1,2-bis-(2,6-dichlorophenyl)ethane
1,1-bis-(2-chloro-4-iodophenyl)ethane
1,1-bis-(2-chloro-4-methylphenyl)ethane
1,1-bis-(3,5-dichlorophenyl)ethane
2,2-bis-(3-phenyl-4-bromophenyl)ethane
2,6-bis-(4,6-dichloronaphthyl)propane
2,2-bis-(2,6-dichlorophenyl)pentane
2,2-bis-(3,5-dichromophenyl)hexane
bis-(4-chlorophenyl)phenylmethane
bis-(3,5-dichlorophenyl)cyclohexylmethane
bis-(3-nitro-4-bromophenyl)methane
bis-(4-hydroxy-2,6-dichloro-3-methoxyphenyl)methane
2,2-bis-(3,5-dichloro-4-hydroxyphenyl)propane
2,2-bis-(3-bromo-4-hydroxyphenyl)propane.

The preparation of these and other applicable biphenyls are known in the art. In place of the divalent aliphatic group in the above examples may be substituted sulfide, sulfoxy, and the like. Included within the above structural formula are substituted benzenes exemplified by 1,3-dichlorobenzene, 1,4-dibromobenzene, 1,3-dichloro-4-hydroxybenzene, hexachlorobenzene, hexabromobenzene, and compounds such as 2,2' - dichlorobiphenyl, 2,4' - dibromodiphenyl, 2,4'-dichlorobiphenyl and decabromodiphenyl oxide.

The preferred halogen compounds for this invention are aromatic halogen compounds such as chlorinated benzene, brominated benzene, chlorinated biphenyl, chlorinated biphenyl, brominated biphenyl, brominated terphenyl, or a compound comprising two phenyl radicals connected with an oxygen atom and having at least two chlorine or bromine atoms per phenyl nucleus and mixtures of at least two of the foregoing.

Especially preferred are hexabromobenzene and decabromodiphenyl oxide alone or mixed with antimony oxide.

In general, the preferred phosphate compounds may be selected from elemental phosphorus or organic phosphonic acids, phosphonates, phosphinates, phosphonites, phosphinites, phosphene oxides, phosphenes, phosphites and phosphates. Illustrative are triphenyl phosphene oxide. This can be used alone or mixed with hexabromobenzene or a halogenated diphenyl oxide and optionally, antimony oxide.

Typical or the preferred phosphorus compounds which may be employed in this invention would be those having the general formula:

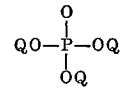

where each Q represents the same or different radicals including hydrocarbon radicals such as alkyl, cycloalkyl, aryl, alkyl substituted aryl and aryl substituted alkyl; halogen; hydrogen and combinations thereof provided that at least one of said R's is aryl. Typical examples of suitable phosphates include, phenylbisdodecyl phosphate, phenylbisneopentyl phosphate, phenylethylene hydrogen phosphate, phenyl-bis-(3,5,5'-trimethylhexyl phosphate), ethyldiphenyl phosphate, 2-ethylhexyl di(p-tolyl) phosphate, diphenyl hydrogen phosphate, bis(2-ethylhexyl) p-tolylphosphate, tritoly phosphate, bis(2-ethylhexyl)phenyl phosphate, tri(nonylphenyl)phosphate, phenylmethyl hydrogen phosphate, di(dodecyl) p-tolyl phosphate, tricresyl phosphate, triphenyl phosphate, dibutylphenyl phosphate, 2-chloroethyldephenyl phosphate, p-tolyl bis(2,5,5'-trimethylhexyl)phosphate, 2-ethylhexyl-diphenyl phosphate, diphenyl hydrogen phosphate, and the like. The preferred phosphates are those where each R is aryl. The most preferred phosphate is triphenyl phosphate. It is also preferred to use triphenyl phosphate in combination with hexabromobenzene and, optionally, antimony oxide.

Also suitable as flame-retardant additives for this invention are compounds containing phosphorus-nitrogen bonds, such as phosphonitrilic chloride, phosphorus ester amides, phosphoric acid amides, phosphonic acid amides, phosphinic acid amides, tris(aziridinyl)phosphine oxide or tetrakis(hydroxymethyl)phosphonium chloride. These flame-retardant additives are commercially available.

The silica employed in the invention is preferably a finely powdered fumed colloidal silica. A silica which is particularly preferred is commercially available as Cab-O-Sil-EH–5. The particular silica however is not critical as long as it is a finely divided fumed colloidal silica. Cab-O-Sil-EH–5 is a sub-microscopic fumed silica having on a dry basis 99% silicon dioxide. It has a surface area of 390±40 m.²/gm. (BET), a nominal particle size of 0.007 micron, a maximum density of 2.3 lbs./cu. ft., an ignition loss (1000° C. moisture free basis) 2.5% and pH (4% aqueous dispersion) of 3.5–4.2. The fumed colloidal silica may be employed at a range of 0.25% to 4% by weight however, a particularly preferred range is 0.5% to 2.0% by weight. Within this particularly preferred range it has been found advantageous to employ in certain compositions about 1.25% by weight.

The compositions of this invention can be prepared by a number of procedures. In one way, glass roving (a bundle of strands of filaments) is chopped into small pieces e.g., ¼" to 2" in length and put into an extrusion compounder with the polyester resin, flame retardant additive and powdered fumed colloidal silica to produce molding pellets. The fibers are shortened and predispersed in the process coming out at less than ¹⁄₁₆" long. In another procedure, glass filaments are ground or milled to short length and are mixed with the polyester resin, flame retardant additive and powdered fumed colloidal silica by dry blending then either fluxed on a mill and ground or they are extruded and chopped. In still another procedure continuous lengths of glass roving are drawn through a bath of melted polyester resin, flame retardant additive and powdered fumed colloidal silica which coats the filaments and the resin-coated glass strand is comminuted into pellets to form a molding compound. The glass fibers can also be mixed with resin and additives and directly molded, e.g., by injection or transfer molding techniques.

It is always very important to thoroughly free all of the ingredients, resin, glass, and flame retardant additives from as much water as possible.

In addition, compounding should be carried out to ensure that the residence time in the machine is short; the temperature is carefully controlled, the frictional heat is utilized; and an intimate blend between the resin and the additives is obtained.

Although it is not essential, best results are obtained if the ingredients are pre-compounded, pelletized and then molded. Pre-compounding can be carried out in conventional equipment. For example, after carefully predrying the polyester resin and other additives and the glass e.g., under vacuum at 100° C. for 12 hours, a single screw extruder is fed with a dry blend of the ingredients, the screw employed having a long transition section to ensure proper melting. On the other hand, a twin screw extrusion machine e.g., a 28 mm. Werner Pfleiderer machine can be fed with resin and additives at the feed port and glass down stream. In either case, a generally suitable machine temperature will be about 450 to 460° F.

The pre-compounded composition can be extruded and cut up into molding compounds such as conventional granules, pellets, etc. by standard techniques.

The compositions can be molded in any equipment conventionally used for glass-filled thermoplastic compositions. For example, with poly(1,4-butylene terephthalate), good results will be obtained in an injection molding machine e.g., of the Newbury type with conventional cylinder temperatures e.g., 450° F. and conventional mold temperatures, e.g., 150° F. On the other hand with poly(ethylene terephthalate) because of the lack of uniformity of crystallization from interior to exterior of thick pieces, somewhat less conventional but still well known techniques can be used. For example, a nucleating agent such as graphite or a metal oxide, e.g., ZnO or MgO can be included and standard mold temperatures of at least 230° F. will be used. These techniques are described at length in Furukawa et al., U.S. 3,368,995 which is incorporated by reference.

DESCRIPTION OF THE PREFERRED EMBODIMENTS

The following Examples illustrate the invention. They are set forth as a further description but are not to be construed as limiting the invention thereto.

EXAMPLE I

The following composition was prepared:

| Ingredients: | Parts by Weight |
|---|---|
| Poly(1,4-butylene terephthalate) Vituf 1661, manufactured by Goodyear Tire and Rubber Co. m.p. 225° C., tg., 36° C.) | 70.0 |
| Fibrous glass reinforcement (manufactured by Owens-Corning Fiberglass Corp., 1/8" chopped glass rovings) | 30.0 |
| Hexabromobenzene | 7.0 |
| Antimony oxide (Sb$_2$O$_3$) | 3.0 |
| Colloidal fumed silica (Cab-O-Sil-EH-5) | 1.5 |
| Total | 111.5 |

The dry blend is compounded and extruded. The extrudate is pelletized and the pellets are injection molded into test bars measuring 1/8" x 1/2" x 2½". The test results are as follows:

| | |
|---|---|
| Oxygen Index | .265 |
| UL 94 Rating* | SEI |
| Dripping noted while burning | None |

*1/8" thick samples.

EXAMPLE II

Following the procedure of Example I, a composition was prepared which varied from the composition of Example I in that no silica was employed. The dry blend was compounded and extruded. The extrudate was pelletized and the pellets were injection molded into test bars measuring 1/8" x 1/2" x 2½". The test results are as follows:

| | |
|---|---|
| Oxygen Index | 0.23 |
| UL 94 Rating 1/8" thick samples | Burns |
| Dripping noted while burning | Yes |

It can be readily appreciated that this composition fails to meet the flammability requirement.

EXAMPLE III

The following composition was prepared:

| Ingredients: | Parts by weight |
|---|---|
| Poly(1,4 - butylene terephthalate) (Vituf 1661) | 70.0 |
| Fibrous glass reinforcement (Owens-Corning 497 x 3⅛") | 30.0 |
| Decabromodiphenyl oxide | 7.0 |
| Antimony oxide (Sb$_2$O$_3$) | 3.0 |
| Colloidal fumed silica (Cab-O-Sil EH-5) | 1.5 |
| Total | 111.5 |

The dry blend is compounded and extruded. The extrudate is pelletized and the pellets are injection molded into test bars measuring 1/8" x 1/2" x 2½". The test results are as follows:

| | |
|---|---|
| Oxygen Index | .310 |
| UL 94 Rating 1/8" thick samples | SEO |
| Dripping noted while burning | *None |

*External flame must be applied longer than UL 94 requirements for dripping to occur.

EXAMPLE IV

Following the procedure of Example III, a composition was prepared which varied from the composition of Example III in that no silica was employed. The dry blend was compounded and extruded. The extrudate was pelletized and the pellets were injection molded into test bars measuring 1/8" x 1/2" 2½". The test results are as follows:

| | |
|---|---|
| Oxygen Index | .270 |
| UL 94 Rating 1/8" thick samples | SEII |
| Dripping noted while burning | Yes |

EXAMPLE V

The procedure of Example I is repeated, substituting for the lightly sized 497 x 3 glass fiber reinforcement, an unsized, short glass fiber reinforcement (Vitro-Strand, Johns-Manville Sales Corp.). The resulting composition has an exceptionally high degree of flame retardance and is non-dripping.

The procedure of Example I is repeated, substituting for the lightly sized 497 x 3 glass fiber reinforcement, one containing a fire retardant sizing prepared as follows:

Glass fibers containing about 1.2% by weight of a thermoplastic styrene-ethyl acrylate copolymer sizing material (HR–3250, manufactured by Pittsburgh Plate Glass Co.) are dispersed in a 15% by weight chloroform solution of chlorinated biphenyl (Arochlor 1268) then the solvent is evaporated during 4 to 5 hours in a forced air oven until the glass is dry and free flowing. The resulting composition has an exceptionally high degree of flame retardance and non-dripping.

EXAMPLE VI

The procedure of Example I is repeated, substituting for the poly(1,4-butylene terephthalate) the following normally flammable high molecular weight linear polyesters:

a 60/40 ethylene terephthalate-ethylene isophthalate copolyester having an intrinsic viscosity of 0.674 (U.S. 3,047,539, Example III); and
poly(1,3-propylene terephthalate) prepared from trimethylene glycol and methyl terephthalate by the procedure of U.S. 2,465,319, Example 12.

Flame retardant non-dripping glass-reinforced polyester compositions are obtained.

Because of their excellent physical, mechanical, chemical, electrical and thermal properties, their enhanced flame resistance and their non-dripping properties, the resin-glass composites of this invention have many and varied uses. The molding powder formulations may be used alone or mixed with other polymers and may contain various fillers, such as wood flour, diatomaceous earth, carbon black, and the like as well as pigments and dyes, stabilizers, plasticizers and the like. Other examples of useable colloidal fumed silicas are Cab-O-Sil H–5, HS–5, M–5 and MS–5.

Obviously, other modifications and variations of the present invention are possible in the light of the above teachings. It is therefore to be understood that changes made in the particular embodiments of the invention described which are within the full intended scope of the invention as defined by the appended claims.

What is claimed is:

1. A flame retardant, non-dripping thermoplastic composition for molding which comprises:
   (a) a normally flammable high molecular weight linear polyester resin,
   (b) a flame retardant additive in a minor proportion based on said composition but in an amount at least sufficient to render said polyester resin flame retardant and,
   (c) from 0.25–4 percent by weight of fumed colloidal silica.

2. A flame retardant, non-dripping thermoplastic composition for molding which comprises:
   (a) a normally flammable high molecular weight linear polyester resin,
   (b) filamentous glass, in an amount of from 5 to about 90% by weight based on the combined weight of said glass and said resin,
   (c) a flame retardant additive in a minor proportion based on said composition but in an amount at least sufficient to render said polyester resin flame retardant, and
   (d) from 0.25–4 percent of fumed colloidal silica.

3. A composition as defined in claim 2 wherein said polyester is selected from the group consisting of polymeric glycol terephthalate and isophthalate esters having repeating units of the general formula:

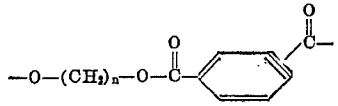

wherein $n$ is a whole number of from 2 to 4, and mixtures of such esters.

4. A composition as defined in claim 3 wherein said polyester is poly(ethylene terephthalate).

5. A composition as defined in claim 3 wherein said polyester is poly(1,4-butylene terephthalate).

6. A composition as defined in claim 2 wherein said flame retardant additive is an organic halogen containing compound; an organic halogen containing compound in admixture with antimony trioxide; elemental phosphorous or a phosphorous compound; a compound containing phosphorous-nitrogen bonds; or mixtures thereof, and said compound is present in an amount of from 0.5 to 50 parts by weight per hundred parts of said resin.

7. A composition as defined in claim 6 wherein said organic halogen-containing compound is an aromatic halogen containing compound selected from the group consisting of chlorinated benzene, brominated benzene, chlorinated biphenyl, chlorinated terphenyl, brominated biphenyl, brominated terphenyl, a compound comprising two phenyl radicals separated by a divalent alkylene or oxygen group and having at least two substituents selected from the group consisting of chlorine and bromine per phenyl radical; and mixtures thereof.

8. A composition as defined in claim 6 wherein said flame retardant additive is hexabromobenzene in admixture with antimony trioxide.

9. A composition as defined in claim 6 wherein said flame retardant additive is selected from the group consisting of elemental phosphorous, organic phosphoric acids, phosphonates, phosphinates, phosphinites, phosphine oxides, phosphines, phosphites, phosphates and mixtures thereof.

10. A composition as defined in claim 6 wherein said flame retardant additive is a mixture of hexabromobenzene, antimony trioxide and decabromodiphenyl oxide.

11. A method for rendering a normally flammable high molecular weight linear thermoplastic polyester resin composition flame retardant and non-dripping which comprises dispersing therein a flame retardant additive in a minor proportion based on said composition but in an amount at least sufficient to render said polyester resin flame retardant and from 0.25–4 percent by weight of fumed colloidal silica.

12. A method as defined in claim 11 wherein the polyester composition includes from 5 to 90% by weight of filamentous glass based on the combined weight of glass and resin.

13. A method as defined in claim 11 wherein the polyester is selected from the group consisting of polymeric glycol terephthalate and isophthalate esters having repeating units of the general formula:

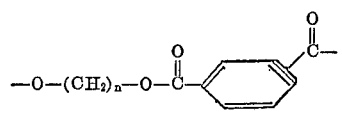

wherein $n$ is a whole number of from 2 to 4, and mixtures of such esters.

14. A method as defined in claim 11 wherein said polyester is poly(ethylene terephthalate).

15. A method as defined in claim 11 wherein said polyester is poly(1,4-butylene terephthalate).

16. A composition as defined in claim 1 wherein the amount of fumed colloidal silica is in the range of 0.5–2.0% by weight.

17. A composition as defined in claim 2 wherein the amount of fumed colloidal silica is in the range of 0.5–2.0% by weight.

18. A method as defined in claim 11 wherein the amount of fumed colloidal silica is from 0.5–2.0% by weight.

References Cited

UNITED STATES PATENTS

| | | | |
|---|---|---|---|
| 3,624,024 | 11/1971 | Caldwell et al. | 260—40 R |
| 3,516,957 | 6/1970 | Gray et al. | 260—40 R X |
| 3,368,995 | 2/1968 | Furukawa et al. | 260—40 R |

FOREIGN PATENTS

| | | | |
|---|---|---|---|
| 578,884 | 7/1946 | Great Britain. | |
| 1,191,569 | 3/1968 | Germany. | |
| 879,151 | 8/1971 | Canada | 260—40 R |

OTHER REFERENCES

Doyle: Development and Use of Polyester Products, Mar. 18, 1969, McGraw-Hill (TPM 80. P6D6–A.V. 145) p. 309.

Modern Plastics Encyclopedia, 1965, vol. 42, No. 1A, p. 395.

Hattori et al.: *Plastics Design and Processing* (August 1967), pp. 28–30.

Rose et al. (ed.): *Condensed Chemical Dictionary* 6th edition, 1961, page 192.

ALLAN LIEBERMAN, Primary Examiner

S. M. PERSON, Assistant Examiner

U.S. Cl. X.R.

260—Dig. 24

PO-1050
(5/69)

UNITED STATES PATENT OFFICE
CERTIFICATE OF CORRECTION

Patent No. 3,833,535          Dated September 3, 1974

Inventor(s) Allen D. Wambach

It is certified that error appears in the above-identified patent and that said Letters Patent are hereby corrected as shown below:

Column 1, line 45, "terephthalate" should be -- terephthalates --.

Column 3, line 12, "the" should be deleted.

Column 3, line 33, "and" should be -- are --.

Column 5, line 66, (beginning on line 65) "dibromodiphenyl" should be -- dibromobiphenyl --.

Column 6, line 30, "tritoly" should be -- tritolyl --.

Column 7, line 1, "length" should be -- lengths --.

Signed and sealed this 24th day of December 1974.

(SEAL)
Attest:

McCOY M. GIBSON JR.
Attesting Officer

C. MARSHALL DANN
Commissioner of Patents